July 19, 1927.
F. L. JOHNSON
1,636,055
COLLAPSIBLE TIRE BUILDING FORM
Filed Aug. 15, 1924  4 Sheets-Sheet 3
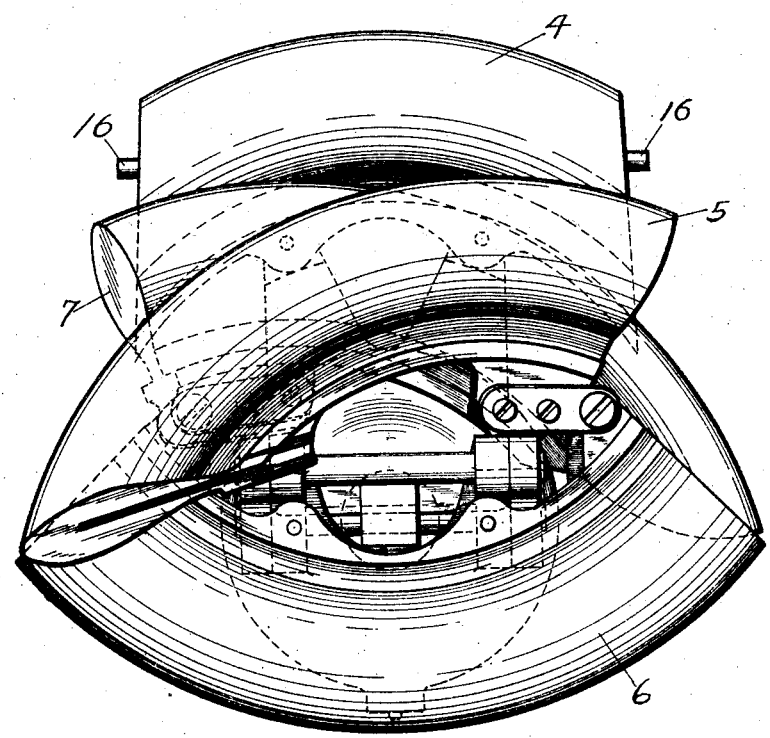
FIG. 5
INVENTOR.
FRANK L. JOHNSON
BY
ATTORNEY.

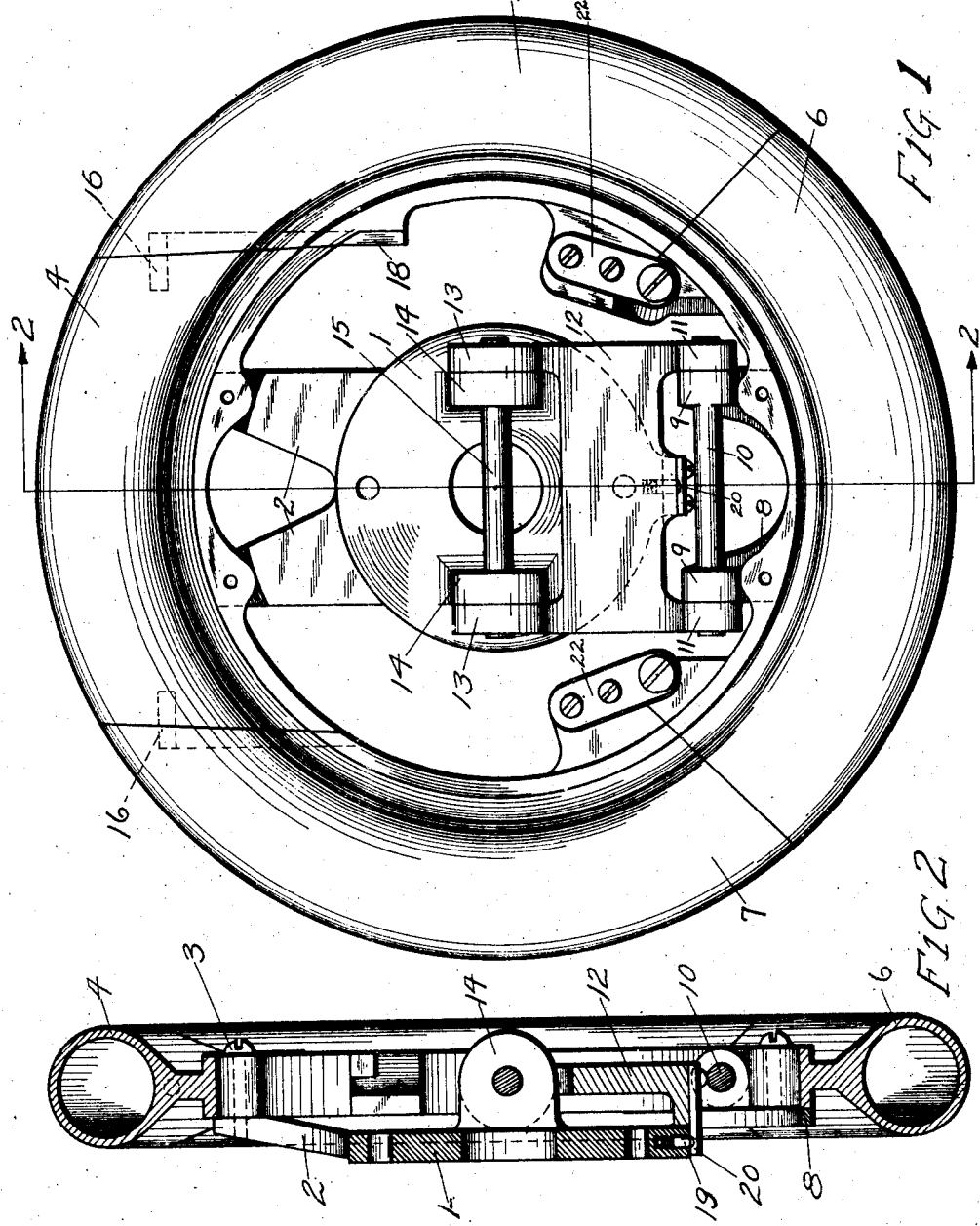
July 19, 1927.
F. L. JOHNSON
COLLAPSIBLE TIRE BUILDING FORM
Filed Aug. 15, 1924    4 Sheets-Sheet 1
1,636,055
INVENTOR.
FRANK L. JOHNSON
BY
ATTORNEY.

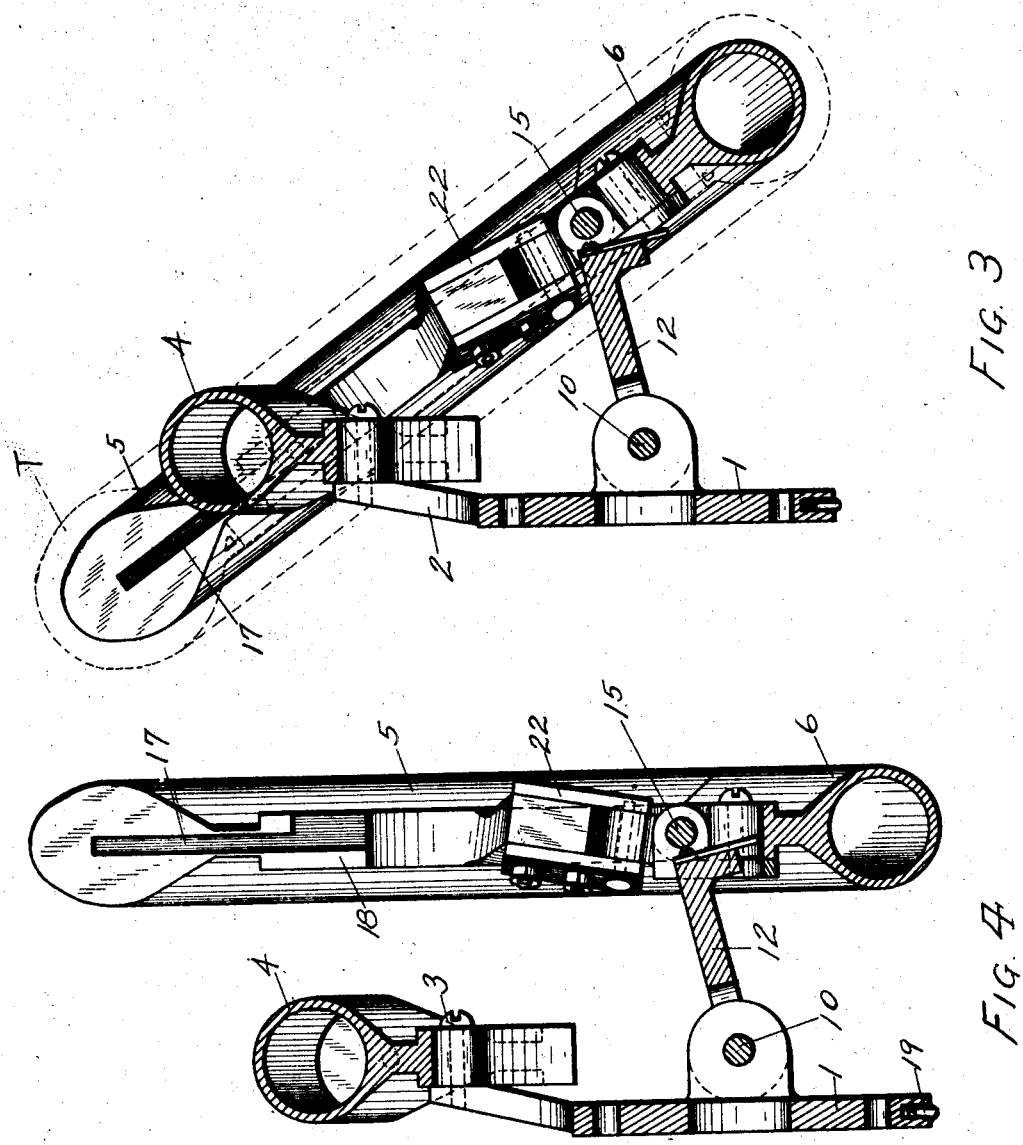

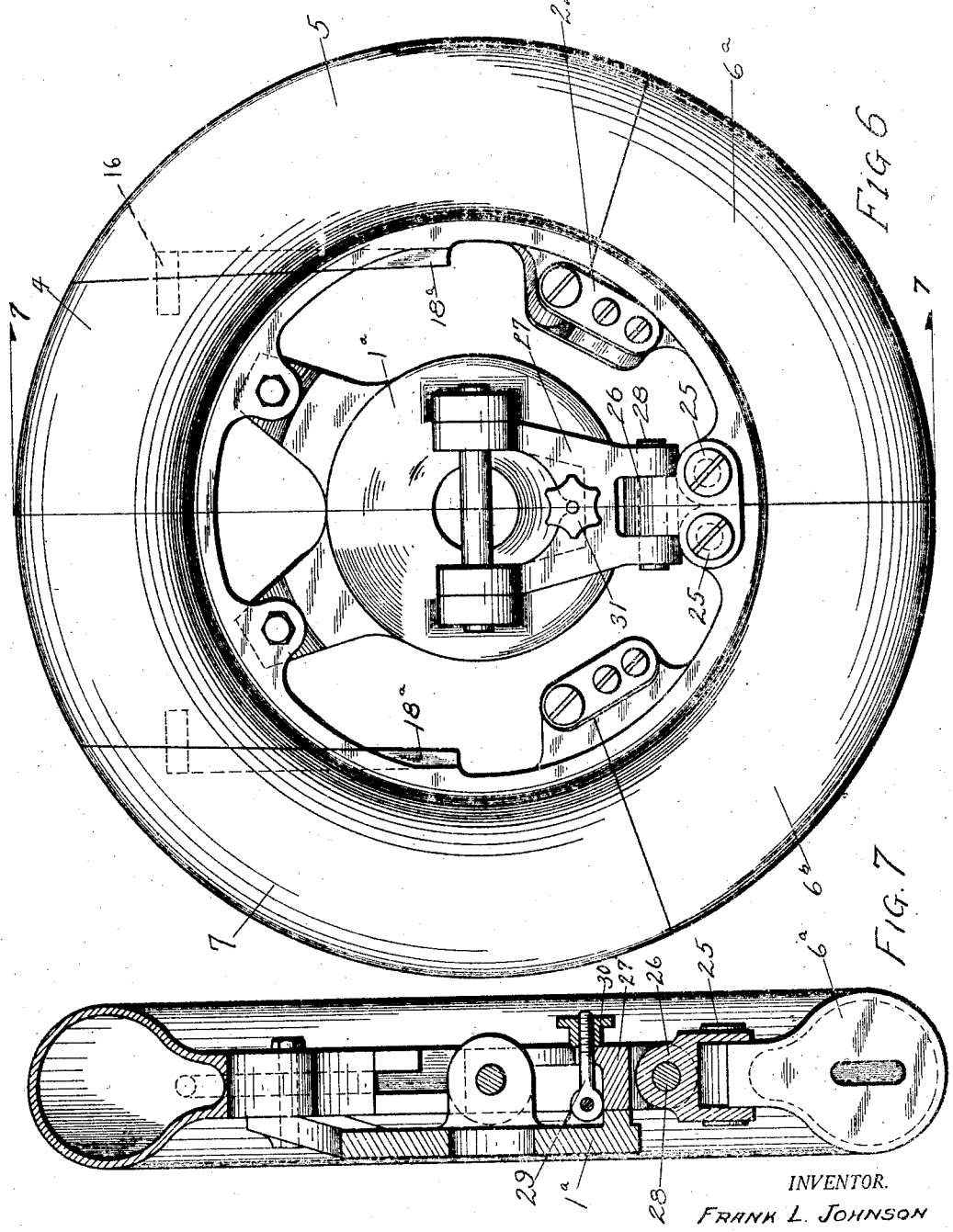

Patented July 19, 1927.

1,636,055

UNITED STATES PATENT OFFICE.

FRANK L. JOHNSON, OF AKRON, OHIO.

COLLAPSIBLE TIRE-BUILDING FORM.

Application filed August 15, 1924. Serial No. 732,285.

This invention relates to a form of collapsible form or cores, such as used in the manufacture of pneumatic tires, which is of the type characterized by the fact that the form is composed of a plurality of sections which are combined with a collapsing mechanism so that the form can be removed from within the tire casing without demounting the core from the tire machine.

One object of the present invention is to improve upon cores of the type described, by the construction of a core which can be collapsed quickly and easily and which will occupy, in collapsed position, a small area so that tires having small internal bead diameters can be removed easily. The new and improved core, embodiments of which are herein illustrated, is particularly useful in the manufacture of tires of large cross-section and small bead diameters, known in the trade as "balloon" tires, as it permits the sections of the core to be arranged in such positions that the finished tire may be removed with great facility.

In the drawings are illustrated certain embodiments of the invention, it being understood that changes and modifications may be made in the invention without departure from the essential features thereof, as stated in the appended claims.

Figure 1 is a front elevation of a form of the invention, showing the core in assembled or circular position;

Figure 2 is a vertical section through the core on the line 2—2 of Figure 1;

Figure 3 is a view of the core in cross-section showing the first movement in the collapsing operation;

Figure 4 is a similar view showing the second movement;

Figure 5 is a front elevation of the core in fully collapsed position;

Figure 6 is a front elevation of a modification of the core; and

Figure 7 is a section on the line 7—7 of Figure 6.

Referring to the form of the invention shown in Figures 1 to 5 inclusive, the core shown therein embodies a plate 1, which is adapted to be attached to the forward end of the shaft of the tire making machine, or to the shaft of a tire building stand. The plate is provided with projecting arms 2, to which is rigidly attached by bolts 3 a core section 4 which is tapered outwardly slightly, constituting a key section.

The remainder of the core is divided into a plurality of sections 5, 6 and 7, which are hinged together so that when the three sections are removed from their position in the plane of the section 4, these three sections can be folded up in any suitable manner to permit the removal of the tire.

Of the three sections 5, 6 and 7, one section, preferably the central section, is provided with a bracket 8 formed with bearings 9 in which is secured a shaft 10, to the ends of which are pivoted lugs 11 which are carried upon a pivotally mounted link 12. The link 12 is formed at the side opposite the lugs 11 with lugs 13 embracing lugs 14 formed on the plate 1. A shaft 15 passes through the lugs 13 and 14 and constitutes a pivotal bearing for the link 12.

By the construction which has been described, it will be observed that, when it is desired to remove the tire from the core, the operator swings the sections 5, 6 and 7 as a unit or group outwardly and upwardly from the plate 1, this movement freeing the tire from the stationary or rigid section 4. The group of sections can then be swung into position substantially parallel to the plate 1, in which position the sections can be folded together upon their hinges to permit the removal of the tire.

One of the principal features of the invention, therefore, is the provision of a stationary or rigid section and the pivotal mounting of the remaining sections so that they are movable as a group or unit, carrying the tire T with them away from the rigid section. The group of sections may be collapsed in any suitable manner.

In the form of core shown herein, the sections 5 and 7 are connected to the section 6 by angular or oblique hinges 22, so that when the core is fully collapsed the sections pass one another and assume the position shown in Figure 5 of the drawings.

The section 4 and the adjacent ends of the sections 5 and 7 are provided with any suitable guiding device for guiding the sections of the core into correct position. In the form shown in the drawings, the section 4 carries dowels 16 which engage in grooves or guideways 17 in the ends of the core sections. In order to facilitate the entrance of the dowels in the grooves, the base of the core may be extended at one side of the groove, as at 18, to afford a stop for the swinging core sections.

Any suitable means may be provided for locking the core in assembled position, so that it will not collapse accidentally while in use. As shown in the drawings, this may take the form of a spring latch 19 on the plate 1 which will engage with a projecting latch 20 secured to the link 12.

In the modified form of the invention shown in Figures 6 and 7, the core section 6 is divided into two sections, $6^a$ and $6^b$, which are pivotally connected by pins 25 to a knuckle joint 26 which is, in turn, pivoted to the link 27 by hinge pin 28. In this form of the invention, the plate $1^a$ is of slightly different form from the plate 1, and a swinging bolt 29, provided with a nut 30, is pivoted on the plate $1^a$ and is received in a notch 31 in the link 27, this arrangement being a substitute for the spring latch of the other embodiment of the invention. In this form of the invention two guiding plates $18^a$ are provided for the dowels 16.

It will be observed that by dividing the central section 6 into two parts, $6^a$ and $6^b$, the collapsed core will be contracted into a much smaller compass when where the section is in one piece and, as a result, the core may be used conveniently in the manufacture of tires of extremely large cross-section and small bead diameters.

It is obvious that other changes and modifications may be made within the scope of the invention as defined by the claims appended hereto and such as fall within the fair range of the invention are intended to be covered hereby.

What is claimed is:

1. A collapsible form for use in building pneumatic tires, comprising a key section held at a fixed distance from the axis of the core and a plurality of hinged sections, the hinged sections being bodily movable as a group to remove the tire from the key section.

2. In a collapsible tire building form, a rigidly mounted key section, the remaining sections of the core being mounted so as to be bodily movable as a unit to remove the tire from the key section.

3. In a collapsible core construction, a rigidly mounted key section and a group of hinged core sections constituting the balance of the core, the group being bodily movable as a unit outwardly both radially and laterally from the key section.

4. In a collapsible core construction, a rigidly mounted section, a second section mounted to move bodily outwardly both radially and laterally of the key section, and sections carried by and movable with the second section intermediate the aforesaid sections.

5. In a collapsible core construction, a section held at a fixed distance from the axis of the core, a second section mounted to move bodily outwardly both radially and laterally of the key section, and sections carried by the movable section and adapted to fit between the movable and the rigid sections.

6. In a collapsible core construction, a plate, a core section rigidly secured to the plate, a link pivoted upon the plate and a second core section pivoted on the end of the link, whereby the second core section may be movable to a position outwardly of but parallel to the plane of the rigid section.

7. In a collapsible core construction, a plate, a core section rigidly secured to the plate, a link pivoted upon the plate, a second core section pivoted to the end of the link and intermediate sections carried by the second section.

8. In a collapsible core construction, a plate, a core section rigidly secured to the plate, a link pivoted upon the plate, a second core section pivoted to the end of the link and intermediate sections located between the aforesaid sections.

9. In a collapsible core construction, a plate, a core section rigidly secured to the plate, a link pivoted upon the plate, a second core section pivoted to the end of the link and intermediate sections carried by and hinged to the second section.

10. In a collapsible core construction, a plate, a core section carried by the plate, a link pivoted to the plate, a second core section pivoted to the end of the link and intermediate core sections located between the aforesaid sections.

11. In a collapsible core construction, a plate, a core section carried by the plate, a link pivoted to the plate, a second core section pivoted to the end of the link and intermediate core sections hinged to the ends of the second section.

12. In a collapsible core construction, a plate, a core section carried by the plate, a link pivoted to the plate, a second core section pivoted to the end of the link and a third section hinged to the end of the second section.

13. In a collapsible core construction, a plate, a core section carried by the plate, a link pivoted to the plate, a second core section pivoted to the end of the link and intermediate core sections obliquely hinged to the ends of the second section.

14. In a collapsible core construction, a plate, a core section carried by the plate, a link pivoted to the plate, a second core section pivoted to the end of the link, intermediate core sections hinged to the ends of the second section and a lock to maintain the core in assembled position.

15. In a collapsible core construction, a plate, a core section carried by the plate, a link pivoted to the plate, the remaining core sections being carried by the link, and locking means to maintain the link in fixed relation with respect to the plate.

16. In a collapsible core construction, a plate, a fixed core section carried by the plate, a link pivoted to the plate, parallel pivots carried on the end of the link and a two-part core section, each part of which is carried upon one of said pivots.

17. In a collapsible core construction, a plate, a link pivoted to the plate, a knuckle pivoted to the end of the link, two pivots in the knuckle, and core sections carried upon the pivots.

18. In a collapsible core construction, a plurality of core sections, all of which are pivoted together, and a series of pivots for said sections equal to the number of sections.

19. In a collapsible core construction, a portion of the core being composed of four sections which are pivoted together, the outer two sections being obliquely pivoted to the plane of the core and the inner two sections being pivoted upon an axis normal to the plane of the core.

FRANK L. JOHNSON.